(12) United States Patent
White

(10) Patent No.: US 10,626,051 B2
(45) Date of Patent: Apr. 21, 2020

(54) SYSTEMS, METHODS, AND APPARATUSES FOR RECYCLING ELECTRONIC WASTE

(71) Applicant: EMM, LLC, Denver, CO (US)

(72) Inventor: Diane White, Denver, CO (US)

(73) Assignee: EMM, LLC, Denver, CO (US)

(*) Notice: Subject to any disclaimer, the term of this patent is extended or adjusted under 35 U.S.C. 154(b) by 309 days.

(21) Appl. No.: 15/494,282

(22) Filed: Apr. 21, 2017

(65) Prior Publication Data

US 2017/0305792 A1    Oct. 26, 2017

Related U.S. Application Data

(60) Provisional application No. 62/326,562, filed on Apr. 22, 2016.

(51) Int. Cl.
| | | |
|---|---|---|
| *B29B 17/00* | (2006.01) | |
| *C04B 28/02* | (2006.01) | |
| *B29B 17/04* | (2006.01) | |
| *C04B 111/60* | (2006.01) | |

(52) U.S. Cl.
CPC ............. *C04B 28/02* (2013.01); *B29B 17/04* (2013.01); *B29B 2017/0089* (2013.01); *C04B 2111/60* (2013.01); *Y02W 30/91* (2015.05)

(58) Field of Classification Search
None
See application file for complete search history.

(56) References Cited

U.S. PATENT DOCUMENTS

| | | | | |
|---|---|---|---|---|
| 2002/0185414 A1* | 12/2002 | Morii | ..................... | B03B 9/061 209/12.1 |
| 2003/0069745 A1* | 4/2003 | Zenko | ..................... | B09B 5/00 705/308 |
| 2007/0054106 A1* | 3/2007 | Armstrong | ............. | B03B 9/061 428/304.4 |
| 2011/0017644 A1* | 1/2011 | Valerio | ................... | B03B 9/061 209/38 |
| 2011/0041733 A1* | 2/2011 | Bartl | ..................... | C04B 18/22 106/668 |
| 2012/0052255 A1* | 3/2012 | Abadi | ..................... | C08J 11/06 428/195.1 |
| 2012/0174369 A1* | 7/2012 | Ming | ..................... | B02C 21/00 29/426.2 |
| 2012/0192772 A1* | 8/2012 | Villatoro | .................. | F23G 5/02 110/346 |

(Continued)

OTHER PUBLICATIONS

Senthill Kumar et al "Recycling of E-plastic waste as a construction material in developing countries", J Mater Cycles Waste Manag (2015) 17:718-724, published online Aug. 26, 2014 (Year: 2014).*

(Continued)

*Primary Examiner* — Mary Lynn F Theisen
(74) *Attorney, Agent, or Firm* — Neugeboren O'Dowd PC

(57) ABSTRACT

A method for recycling electronic waste may method comprise receiving electronic waste from an electronic waste-generating entity, separating components of the electronic waste into valuable recyclable material, hazardous material, and disposable non-hazardous material, creating a plurality of building material units comprising the disposable non-hazardous material, and sending at least a portion of the plurality of building material units back to the electronic waste-generating entity.

11 Claims, 9 Drawing Sheets

(56) References Cited

U.S. PATENT DOCUMENTS

2015/0174626 A1* 6/2015 Nagpaul ................. B09B 5/00
428/34.1
2018/0015515 A1* 1/2018 Sivakumar ............... B03B 9/06

OTHER PUBLICATIONS

Arora et al, "Utilization of E-waste and Plastic Bottle Waste in Concrete", International Journal of Students Research in Technology & Management, vol. 1(04), Aug. 2013, pp. 398-406 (Year: 2013).*

* cited by examiner

SYSTEMS, METHODS, AND APPARATUSES FOR RECYCLING ELECTRONIC WASTE

CLAIM OF PRIORITY UNDER 35 U.S.C. § 119

The present application for patent claims priority to Provisional Application No. 62/326,562 entitled "SYSTEMS, METHODS, AND APPARATUSES FOR RECYCLING ELECTRONIC WASTE" filed Apr. 22, 2016, and assigned to the Assignee hereof, the entire contents of which are hereby expressly incorporated by reference herein.

FIELD OF THE DISCLOSURE

The present disclosure relates generally to electronic waste recycling. More specifically, but without limitation, the present disclosure relates to closed-loop electronic recycling systems, methods for electronic recycling, and products comprising spent or used electronic waste.

BACKGROUND OF THE DISCLOSURE

As electronic devices have proliferated over the last one hundred years or so, the problem of how to dispose of spent electronic equipment has necessitated the invention of methods to dispose of it safely. Electronic waste includes whole devices, such as televisions, computers, phones, audio and video recorders, cameras, printers, peripheral devices, and countless other electronic devices. Electronic waste also includes electronic parts, components, and raw materials used in the manufacturing of electronic devices. It is often difficult to dispose of electronic waste in an environmentally-friendly manner, because electronic devices are made up of numerous types of materials with properties that are problematic in different ways. Some of the materials, such as mercury, lead, arsenic, cadmium, battery chemicals, and countless others are too hazardous to simply dispose in landfills without mitigation. Other materials, such as plastics and metals, are not necessarily hazardous, but their size and the time that they take to biodegrade result in large quantities of landfill volume. Further, many of these materials are valuable ones that could be recycled and re-used in other products. The number of electronic devices manufactured and subsequently discarded has multiplied exponentially in recent years, and is likely to continue to increase in the years to come. Some estimates forecast that the currently produced amount of electronic waste will double over the next decade.

Currently, some of the electronic waste is recycled and disposed of in a safe and environmentally responsible manner. Unfortunately, the percentage of all electronic waste that is properly disposed is low. According to the United States Environmental Protection Agency (EPA), on the order of only 15%-20% of waste in the United States is managed responsibly. This is the case even though the United States has fairly stringent regulations on the disposal of electronic waste. Because not all of the waste is properly disposed, the majority of it ends up in United States landfills. Additionally, a large amount of waste is disposed in landfills in countries without electronic waste regulations, creating long-term environmental risks for the land and the countries' inhabitants. A great need exists for improving existing electronic waste recycling systems and for reducing the overall amount of electronic waste.

SUMMARY

An aspect of the disclosure provides a method for recycling electronic waste. The method may comprise receiving electronic waste from an electronic waste-generating entity, separating components of the electronic waste into valuable recyclable material, hazardous material, and disposable non-hazardous material, creating a plurality of building material units comprising the disposable non-hazardous material, and sending at least a portion of the plurality of building material units back to the electronic waste-generating entity.

Another aspect of the disclosure provides a method for recycling electronic waste. The method may comprise receiving electronic waste from an electronic waste-generating entity and shredding the electronic waste into small pieces of e-stock material. The method may further comprise creating a plurality of building material units by encapsulating at least some of the small pieces of e-stock material in a non-leachable material and shaping the non-leachable material and e-stock material into a plurality of substantially uniform building material units. The method may then comprise sending at least a portion of the plurality of building material units back to the electronic waste-generating entity.

Another aspect of the disclosure provides a method for recycling electronic waste. The method may comprise collecting electronic waste at a designated collection site and shredding the electronic waste into small pieces of e-stock material. The method may further comprise creating a plurality of building material units by encapsulating at least some of the small pieces of e-stock material in a non-leachable material and shaping the non-leachable material and e-stock material into a plurality of substantially uniform building material units. The method may then comprise providing at least some of the plurality of building material units for consumer end-use.

DETAILED DESCRIPTION

Figure 1:
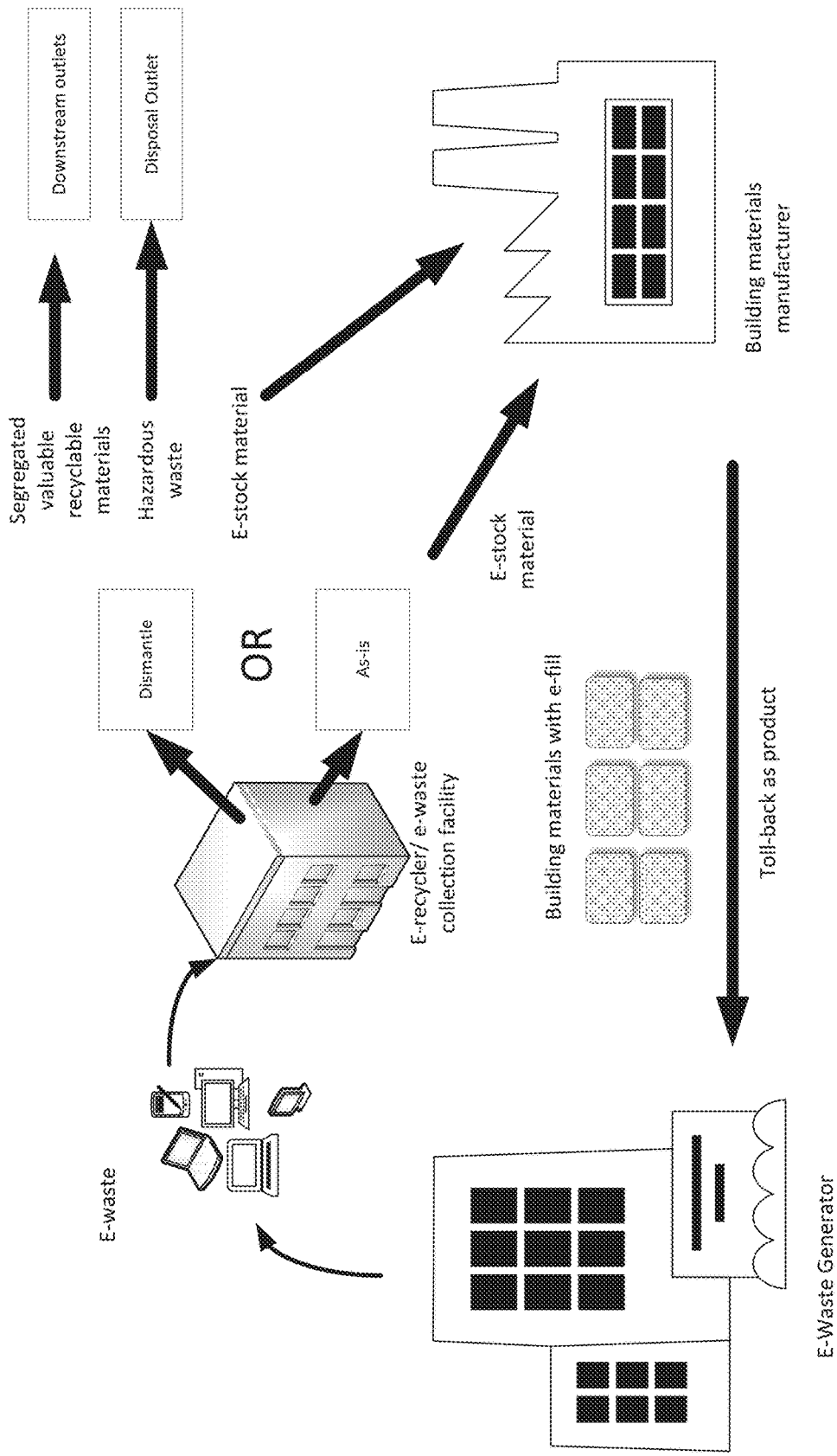
FIG. 1 is a diagram of a closed-loop recycling system of the present disclosure, in which recycled electronic waste is sent back to the generator of the electronic waste in the form of building products.

There are several categories of producers of electronic waste, which may be referred to as "e-waste" throughout this disclosure. The categories include both individual consumers and businesses. Businesses are typically classified by various regulating bodies as either conditionally exempt small-quantity generators (CESQG), small quantity generators (SQG), or large quantity generators (LQG). Individual consumers include residential household users of electronic equipment, including microwaves, computers, toasters, televisions, monitors, cell phones, keyboards, and other similar electronic devices. These residential consumers typically discard spent electronic waste by throwing the used media in the trash, setting it out on the street curbside for either trash collectors, neighbors, or scrap material scavengers, or placing it next to public dumpsters for municipal pickup, if available. In many cases, disposing of devices in any of these ways is improper due to the hazardous material that may be contained in some of these devices. Additionally, it is wasteful of valuable recyclable material that could be re-used. The fact that consumers are unaware of how to properly dispose of electronic media and e-waste perpetuates the mismanagement of e-waste. Aspects of the present disclosure apply to all types and sizes of producers of e-waste.

Several laws prohibit individuals and companies from improperly disposing of e-waste. In the United States, the Resource Conservation and Recovery Act (RCRA) is the main federal law that governs the disposal of hazardous and non-hazardous material, including that which is called e-waste. Most states have similar state law provisions. Not all individual consumers are aware of these laws and they are difficult to enforce. Recently, though, consumers have become aware of e-waste recycling programs through which they may dispose of their old electronics for free at certified county hazardous and solid-waste drop-off locations, and more recently, at certain electronics retailers.

Businesses of various sizes (including the aforementioned CESQG, SQG, and LQG) are generally aware of their responsibilities regarding e-waste disposal, and are encouraged by state and federal regulations to dispose of their e-waste appropriately. However, currently, these generators only have a few options to do so. The two main options are to either have their e-waste dismantled by a certified electronics recycler, or they may crush and micro-encapsulate their e-waste and send it to a hazardous waste landfill that meets specific criteria defined in Subtitle C of the RCRA (commonly referred to as "Subtitle C landfills"). Both of these processes will be described in further detail later in this disclosure. Each of these options require laborious and costly reporting to government entities. Hundreds of electronics recycling businesses, which many be referred to as "e-recyclers" throughout this disclosure, and micro/macro-encapsulation disposal facilities, exist just in the United States alone to serve the needs of small to large quantity e-waste generators.

In the process of e-recycling, typically, an e-recycler will perform all or part of the process of receiving (or picking up) the e-waste, and then separating particular devices and materials into "downstream recyclable material." This downstream recyclable material usually comprises valuable components that may be re-used, including precious metals such as copper, aluminum, stainless steel, platinum, and other worthwhile components such as large sections of glass and plastic. Often, e-recyclers claim that they recycle one hundred percent of the material in the spent electronics that they receive, but in many cases, recycling one hundred percent of the material is not practical or feasible. One reason recycling absolutely all of the material is difficult is because not all of the material is separable and/or valuable as a recyclable component; another reason is that some of the e-waste is hazardous. For the purposes of the present disclosure, the general term "hazardous material" may encompass the category of materials designated by the United States Environmental Protection Agency (EPA) as "universal wastes," which include batteries, mercury-containing equipment, bulbs, and anything else containing lead, mercury, arsenic, selenium, cadmium, chromium, and others. In order to maintain clarity between the terms "e-waste" which may include every component of a discarded electronic device, and "universal waste," the term "hazardous e-waste material" will be used throughout the disclosure to refer to any hazardous sub-parts of e-waste.

Once an e-recycler segregates and separates the components, the e-recycler may either sell the downstream recyclable components (e.g., precious metals such as copper, aluminum, stainless steel, platinum, and other worthwhile components such as large sections of glass and plastic) "as-is" to a separate processor of those materials, or it may process the recyclable material itself into a form that is suitable for use by a manufacturer. The e-recycler may also responsibly dispose of the hazardous e-waste material itself by permissible methods. One such method for disposing of waste like lead and mercury is to surround it in concrete such that the hazardous e-waste material cannot leach out of the concrete and into the ground, which is known as micro- or macro-encapsulation. Alternatively, some hazardous materials may be recycled. Various EPA regulations (many of which are part of the RCRA) govern how these hazardous materials may be disposed.

Aside from the downstream recyclable material and the hazardous material, there often remains at least some portion of the spent electronic devices that are not typically valuable or reusable, such as small pieces of plastic or glass. These remaining disposable materials may be considered "clean" according to EPA standards, if they contain no more than trace amounts of hazardous materials, or none at all. The e-recycler may then dispose these remaining materials—those that are neither recyclable nor hazardous—in a landfill. Although e-recyclers claim to recycle all, or a vast majority of the spent electronic devices they receive, the actual volume of material that properly ends up in landfills from reputable e-recyclers is substantial. The sheer volume of this disposable, non-hazardous material itself creates an environmental challenge. In addition, the amount of material improperly disposed by irresponsible e-recyclers further adds to the environmental problems. The most profitable aspects of e-recycling are charging fees to e-waste generators for collecting or accepting e-waste and selling the valuable recyclable components to other users. However, it is typically costly for e-recyclers to dispose of both the disposable non-hazardous and the hazardous material, and there are numerous challenges to doing both.

The other most popular way to dispose of spent electronic devices (aside from e-recycling) is to shred or crush entire devices and then mix the broken-up material into a slurry of concrete. In this process, because no materials are separated from each other prior to the shredding, the shredded electronics material often contains hazardous waste. The process of slurrying material into concrete so that no hazardous material may leach out is known as micro- or macro-encapsulation, the difference between the two being the size of the material that is being encapsulated. The method is typically implemented by mixing crushed e-waste material and concrete into a large container, and then taking the resulting block of concrete and e-waste and putting it into a particular section of a Subtitle C landfill. Such landfills are typically structured such that a generator can identify the particular e-waste that it generated and can retrieve it later if necessary for legal issues. The process of micro/macro-encapsulation mitigates the environmental damage from hazardous materials in comparison to just dumping whole electronics into a regular landfill (i.e., a Subtitle D municipal landfill), but it has several disadvantages. For example, none of the valuable components get recycled. Another disadvantage is that there are currently a limited number of registered Subtitle C landfills, and limited space to create more of them.

One aspect of the present disclosure provides for a closed-loop recycling system between either a CESQG, an SQG, or an LQG, and an e-recycler, wherein some or all of the e-waste is returned back to the generator in the form of a building material. Various embodiments of this closed-loop recycling system take beneficial aspects of both of the two commonly-used disposal methods (traditional e-recycling and micro/macro-encapsulation) while minimizing their respective disadvantages. The system may optionally include a separate manufacturer, which will be described in more detail later in the disclosure. In one embodiment of the system that implements aspects of traditional e-recycling, a e-recycler that is certified under stringent certification standards (e.g., RIOS®, R2®, and e-Stewards) may first receive e-waste from the generator. In this embodiment, the e-recycler may dismantle, shred, and separate the e-waste by conveyor sorting methods into material that which is traditionally considered "downstream recyclable material" and that which is typically considered recyclable non-hazardous material. In some cases, if material contains only negligible amounts of hazardous material small enough to be considered only "trace" amounts, then the material may be disposed of as non-hazardous. The traditionally high-value recyclable material may then be sold to third parties. The hazardous e-waste material may be disposed of according to regulatory requirements. The remaining disposable non-hazardous material, which is voluminous, may be used as filler material in the manufacture of building material such as bricks, pavestones, and other modular units suitable for building or landscaping construction. Details of the building materials will be described further throughout the disclosure, but in general, the process of making such building materials involves concrete and incorporates the main benefit of micro-encapsulation, in which hazardous material cannot leach out and damage the environment. In the closed-loop recycling system, the generator may receive a portion of its own e-waste back in the form of such building materials, the process of which will also be described further in this disclosure.

In another embodiment of the closed-loop recycling system that implements aspects of a traditional micro- or macro-encapsulation disposal system, an e-recycler or other e-waste collection facility may first receive spent electronic devices from a generator. Then, the spent electronic devices may be ground, crushed, or shredded into small chunks of e-waste (which may be referred to as e-stock or e-feed throughout this disclosure) as if it were being prepared for micro-encapsulation by slurrying. However, instead of traditional micro-encapsulation, the e-stock would be used as a filler material in the manufacture of building material such as bricks, pavestones, and other modular units as previously described. It is contemplated that because this method involves shredding entire devices, and the resulting e-stock may likely contain hazardous materials, that the process of manufacturing the building materials may include covering the e-stock with non-leachable material (such as concrete or epoxy resin, for example). By using a non-leachable material in the construction of the building materials, any risks posed by the hazardous materials may be mitigated or completely eliminated. All or a portion of these building materials may also be sent back to the original generator of the e-waste.

A benefit to the generator receiving a portion of the e-waste back in recycled form is that it can take advantage of a method of recycling known as "tolling back." Typically, a generator of e-waste must pay various taxes and fees for the waste that it disposes of. All generators are required to report solid waste quantities on an annual basis. Waste is typically accounted for when it is transported away from a generator by being reported on a hazardous waste manifest. There are ways to reduce the amount of waste that is reported on a manifest. One way is that if the material that could be considered "waste" meets certain toll back requirements, the material may be classified as a "product" instead. There are particular requirements to what constitutes a material to be a legitimate "product" under EPA regulations, but in general, if a waste product can be shown to be put to re-use in a safe manner by the generator or a third party, and that recycled waste product is comparable to existing products that it is replacing, that material may be exempt from waste reporting. The main advantage to having material be classified as a "product" is that it may be shipped and reported on a regular bill of lading, and not on a hazardous waste manifest. As an example, one generator may produce sulfuric acid as a waste product, but a disposal company may ship that sulfuric acid as a "product" on a bill of lading and send it to a different company that uses it in its manufacturing process. It is also possible that such "products" could be sold as retail products to consumers. As a result, the total amount of waste that the generator must report annually may be reduced by the amount of waste it can convert into a product, thereby reducing its associated fees.

Another way the amount of waste that must be reported by a generator is by utilizing a closed-loop recycling or tolling-back system. A system that starts with a generator producing waste that could be converted into a product, then transfers the waste to a recycler or distillation facility, then ends with the generator receiving the waste back in some type of useful form is known as a "closed-loop" or "tollback" recycling system. Many kinds of materials are currently recycled in such a way. For example, if a generator creates e-waste that comprises copper, but then the e-recycler separates out the copper and returns it to the original generator, that process constitutes a closed-loop recycling process. Closed-loop recycling also takes place with hazardous materials, where the generator receives back the cleaned-up hazardous material in order to re-use it in their manufacturing processes.

Currently, there are no closed-loop recycling systems in which the disposable portion of e-waste (either non-hazardous or hazardous) is recycled and returned back to the generator, due to the fact that in traditional e-recycling, such disposable materials typically comprise shards of broken plastic, metal, and other inexpensive materials, and are not typically considered valuable or useful, and that in traditional micro-encapsulation processes, the shredded e-waste is intentionally put into that form for the purpose of disposal.

Given the sheer volume of this disposable material, there is a great benefit to be realized if the disposable material could be converted into a valuable end-product and given back to the generator in a closed-loop recycling system.

An aspect of the present disclosure is that shredded or ground-up disposable e-waste may be used as a substitute for fillers or aggregates normally found in building materials. It is contemplated that the two subtypes of e-waste (disposable hazardous mixed material and disposable non-hazardous material) may be used as a filler for building materials, but various limitations may exist on the disposable hazardous subtypes that do not exist for the disposable non-hazardous subtype. As previously discussed, any disposable e-waste that contains some hazardous material must be prepared for disposal by surrounding it in a non-leachable material, such as concrete. At a minimum, any building materials of the present disclosure which are to be made with disposable hazardous e-waste material will likely include a material that complies with EPA standards for encasing the hazardous material for disposal in a landfill. In addition, the e-waste filler material and the surrounding material together must also comply with any regulations for the particular kind of building material being manufactured. For example, there are currently existing regulations against building material containing asbestos, lead, and polychlorinated biphenyl (PCB). Therefore, it is contemplated that certain building materials according to this disclosure may not ever contain such prohibited material. For example, e-building materials that are sold on the retail market to consumers will not contain any hazardous material at all. In general, there are more stringent regulations on what kinds of materials can be used in the manufacturing of materials used in indoor construction as opposed to regulations on outdoor materials, or decorative materials, such as pavestones. For example, there are currently no ASTM regulations on the content of pavestones. Additionally, it is likely that in some of the types of building materials, it will only be feasible to use non-hazardous disposable material as filler.

Currently, one of the most voluminous types of material separated from e-waste is glass, and much of it is cathode ray tube (CRT) glass. CRT glass is coated with lead on one side, and therefore, would be considered hazardous disposable material. There are methods for removing lead from CRT glass, which would make the non-hazardous glass portion reusable for any type of recycling, but presently, such methods are expensive, and most CRT glass is disposed as hazardous waste. It is contemplated that in the future, removing lead from CRT glass may become more cost effective, in which case the resulting clean glass may be used as aggregate material according to the present disclosure. Any clean glass derived from e-waste of the present disclosure can be used to form a suitable aggregate for the building materials of the present disclosure. Glass can, for example, be broken and tumbled into ⅜ inch aggregate and substituted for sand or gravel in concrete mixtures easily.

One example of a building material in accordance with this disclosure is a pavestone (also known as a "paver", a "patio paver," or a "patio pavestone"), which is normally made mostly out of concrete. Other types of building materials, such as bricks, tiles, cinder blocks, shingles, or sheetrock are also contemplated. In some embodiments, the building materials may be considered purely decorative, and in others, they may include structural materials. Typical pavestone concrete often comprises water, cement, and an aggregate mixture of sand and gravel. Various admixtures may also be used in pavestones to give them additional desirable properties, such as water-repellant additives, super-plasticizers to add strength, and coloring pigments. In embodiments of the present disclosure, the disposable e-waste may be crushed and ground into particle sizes similar to that of aggregates that are normally used for such concrete mixtures, and may then be used as aggregate material itself. Typically, aggregate particles are less than ⅜" in diameter. E-recyclers implementing the systems and method of the present disclosure may grind or shred non-hazardous e-waste into these ⅜" or smaller particles. A supply of such ground or shredded e-waste may be referred to as "electronic feedstock," "e-stock," "feedstock," "e-feed," or "e-fill."

In some embodiments of the system and method, raw e-feed material may be pre-mixed in a thin cement slurry to encapsulate or coat the e-stock. This may be done in order to create a surface around the e-feed material that will chemically bond with the rest of the cement and water mixture that forms the concrete product. In other embodiments, the raw materials comprising the e-feed may have sufficient properties that allow direct binding to the cement and water mixture, and may not require the step of encapsulation in a thin cement slurry.

One aspect of the disclosure is that the e-stock replaces sand or gravel aggregate material in the construction of pavers or other building materials. There are several advantages to using e-feed as an aggregate instead of a sand and gravel mix. One advantage is that the disposable e-waste that comprises the e-stock does not end up in a landfill, potentially saving thousands of tons of material from being discarded there. Another advantage is that it replaces aggregate raw materials such as sand and gravel that would otherwise have to be purchased in order to make concrete. Though sand and gravel are relatively inexpensive raw ingredients, the disposable component of e-waste is typically valued at close to nothing, given that it is otherwise garbage. The EPA maintains that one important factor in qualifying as a legitimate recycling (as opposed to "sham recycling") use is that the end product has value as an actual product. When e-feed can be used as aggregate, it becomes a valuable component of brick and other building materials. The resulting building materials of the present disclosure which comprise e-waste may be marketed and sold as "e-" versions of traditional building materials; for example, they may be called "e-bricks," "e-tiles," "e-pavers," "e-steppers," "e-walls," etc. Therefore, they may be referred to as such throughout the disclosure, and may also be referred to as a group as "e-building materials" or "e-products."

FIG. 1 shows an example of a closed-loop recycling system and method of the present disclosure, in which a generator may send its e-waste to an e-recycler or an e-waste collection facility. If it is sent to an e-recycler, the e-recycler may then separate the e-waste into its various parts. That is, the e-waste may be separated into downstream recyclable materials, hazardous waste, and disposable non-hazardous material. The downstream recyclable material may then go to a downstream outlet (such as a third party user of the material), and the hazardous material may be sent to a proper disposal outlet. The disposable non-hazardous e-stock may then be shredded into ⅜" e-stock and sent to a manufacturer of building materials such as pavestones. In some embodiments, the e-recycler may itself shred the disposable material into ⅜" e-feed, and may also manufacture building materials (e.g., pavestones, bricks, etc.) itself. Alternatively, another recycling partner and/or manufacturer may shred the disposable material and manufacture the building materials.

Still referring to FIG. 1, in some embodiments, the e-waste may be sent to a treatment facility that crushes the spent electronic devices without separating them into parts for recycling, as is commonly done in the traditional micro-encapsulation process at a Subtitle C hazardous waste landfill. In this embodiment, the shredded e-stock may potentially contain hazardous material. It may also be sent to a manufacturer that fabricates building materials (e.g., pavers, e-bricks, etc.) and solely sent back to the generator in a toll back system.

Whether it is one singular e-recycling entity or a combination of one or more of an e-recycler, a recycling partner, and a manufacturer, an aspect of the system is that all the disposable material that is turned into e-stock from one generator is tracked and identified as coming from the generator throughout the cycle. Once the building materials are manufactured with the e-waste from the original generator, the generator may receive them back and use them for construction. The amount (in volume or weight, for example) of e-waste disposable material that is ultimately returned to the original generator may be subtracted (i.e., tolled back) from the total amount of e-waste on which the generator is responsible for paying fees or taxes.

Figure 2:
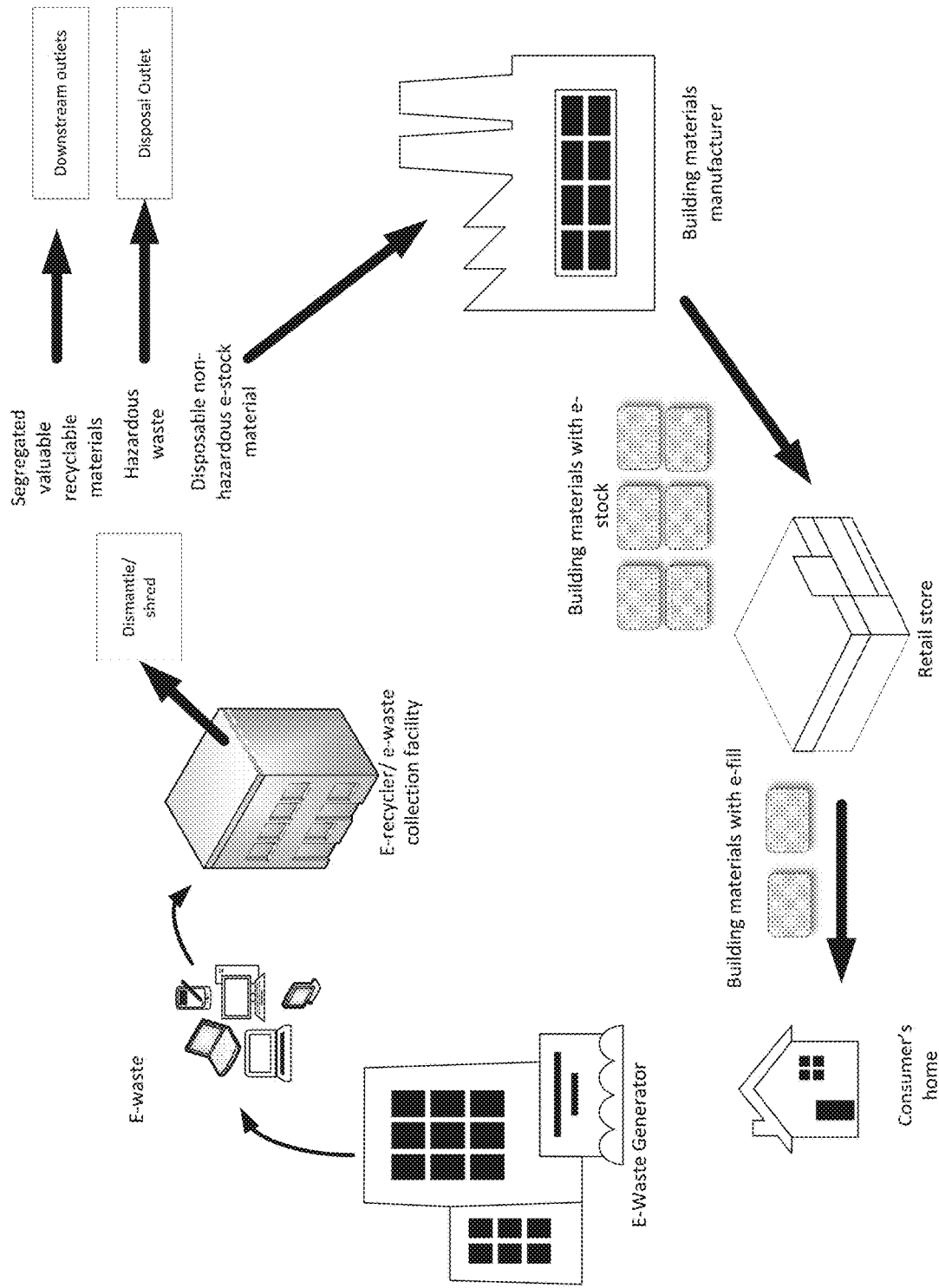
FIG. 2 is a diagram of a recycling system of the present disclosure in which recycled electronic waste from an electronic waste-generating entity is sold to a consumer end-user.

FIG. 2 shows a non-closed loop recycling system in accordance with the present disclosure. The steps are similar to the closed-loop system, except that instead of sending the building materials comprising e-stock to the original generator of the e-waste, the building materials may be introduced into commerce, and sold to any kind of potential user of the building material, including other businesses or individual consumers. In some embodiments of the system, a portion of the e-waste building material may be sent back to the generator while the rest of it is sold to other users, which may be the case for a generator that produces more e-waste than it can re-use in building material form.

Figure 3:
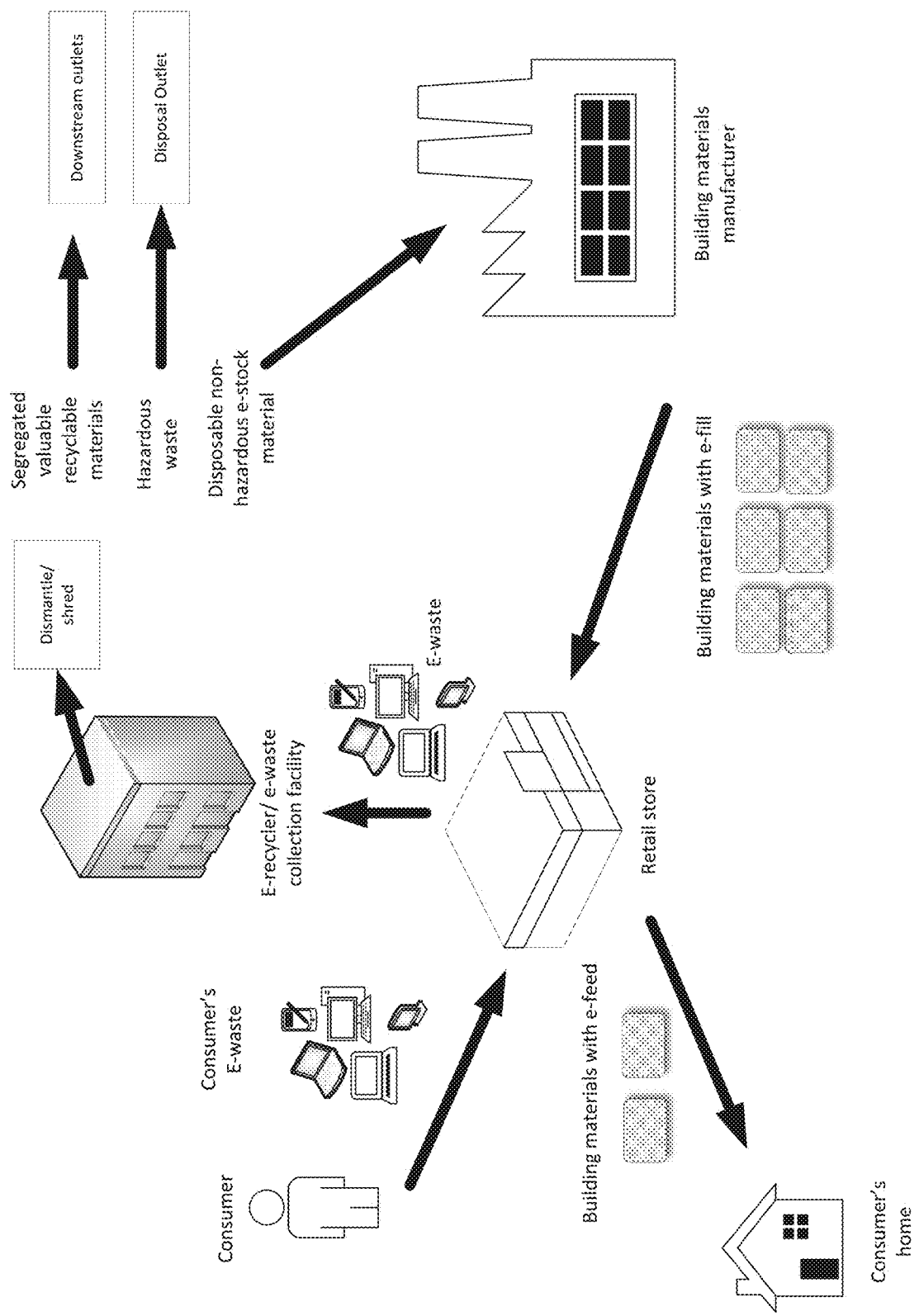
FIG. 3 is a diagram of a recycling system of the present disclosure in which electronic waste from consumers is recycled through a retail store that collects raw electronic waste materials and sells building materials comprising the electronic waste.

It is contemplated that the types of retail stores that may sell building materials include large home improvement stores. Many such stores currently serve as recycling drop-off centers for various hard-to-recycle materials, such as paint and light bulbs, but do not currently provide ways to recycle e-waste. Some electronics retailers do offer electronic device recycling, but those products typically are recycled through traditional e-recycling methods. FIG. 3 shows an embodiment of a system of the present disclosure wherein a consumer may drop off e-waste at a retail store, and that retail store may send the e-waste to an e-recycler and/or manufacturer that produces e-building materials similarly to the systems shown in FIGS. 1 and 2. Then, the retail store may itself re-sell the building materials made from the e-waste it originally collected. An aspect of the present disclosure is that the system of electronics recycling may be advertised and presented to consumers in order to create awareness of e-waste building materials and encourage their purchase. Such advertising may be used to create a market for e-waste building materials that could grow to significantly alleviate the burden of disposing non-hazardous e-waste in landfills. FIG. 3 shows how a consumer may consciously contribute to e-waste recycling at the beginning and end of the cycle by dropping off e-waste and purchasing e-waste building material at the same retail store.

Figure 4:
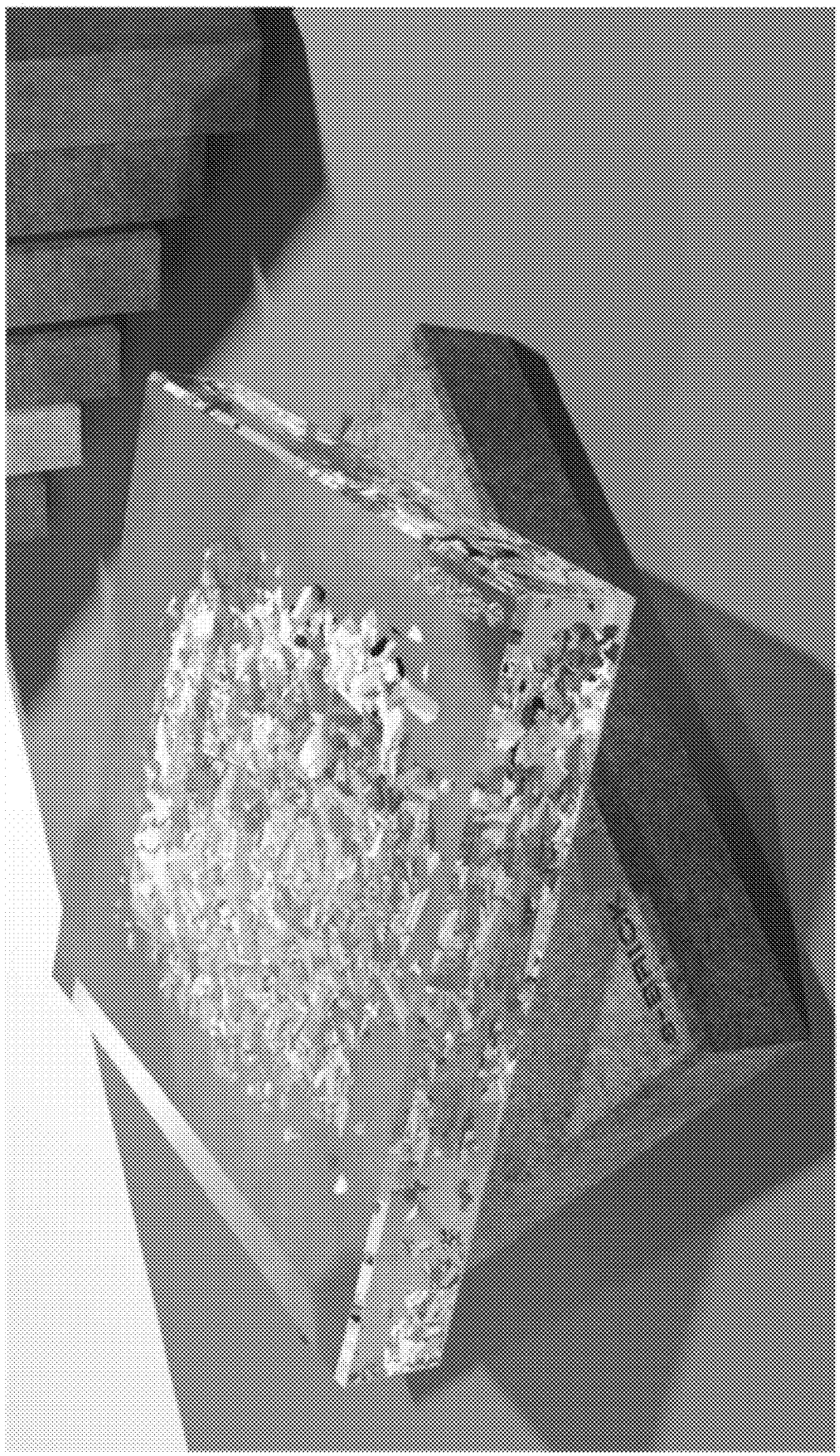
FIG. 4 shows an embodiment of an e-brick building material unit comprising crushed electronic waste encapsulated in a translucent material according to an embodiment of the disclosure.
Figure 5:
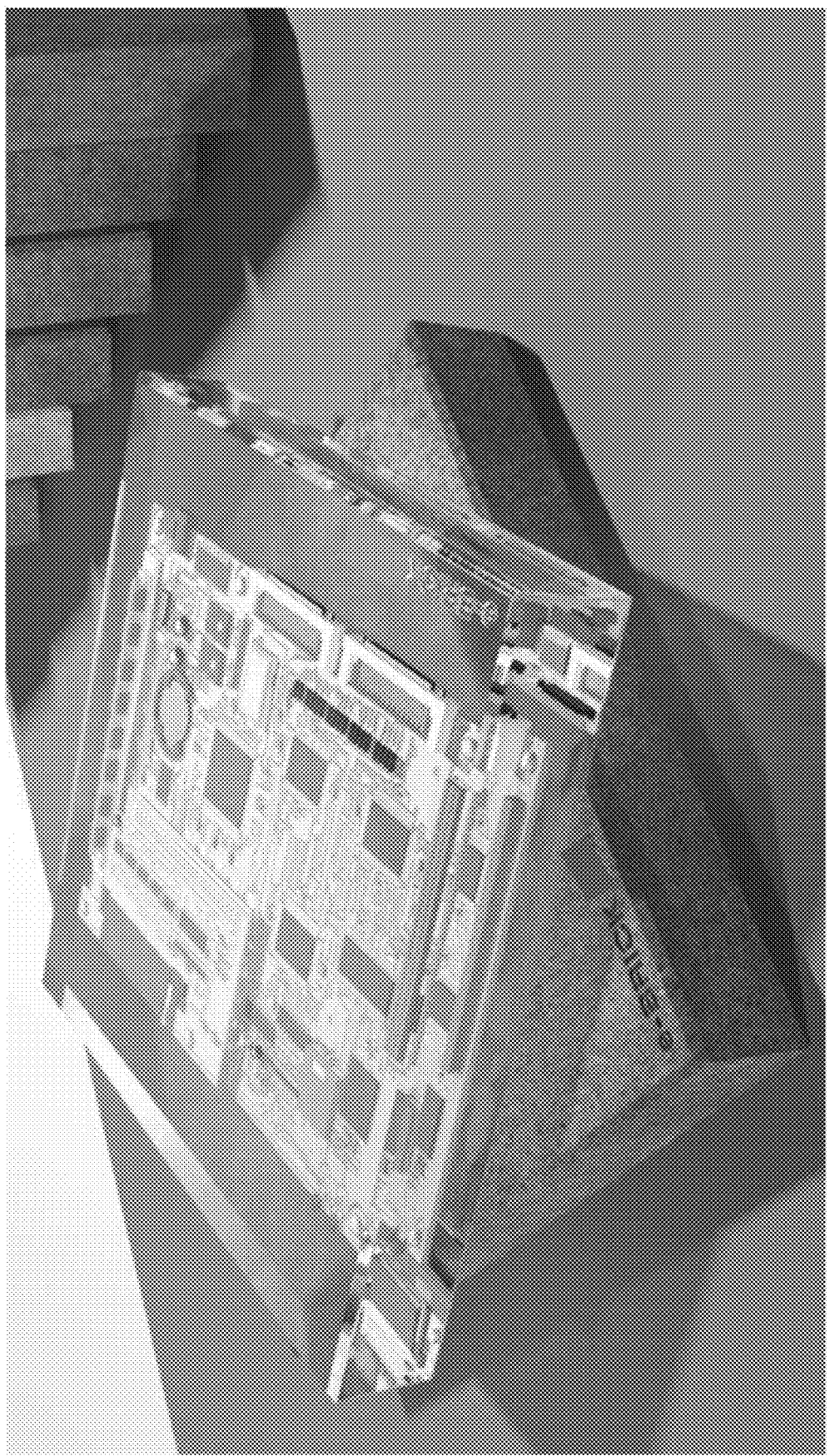
FIG. 5 shows an embodiment of an e-brick building material unit comprising a piece of electronic waste encapsulated in a translucent material according to another embodiment of the disclosure.

FIGS. 4 and 5 show embodiments of building materials according to the present disclosure. FIG. 4 shows an e-brick comprising a substantially whole piece of an electronic circuit board, such as may be found in a laptop computer, and a clear, solid, epoxy resin. FIG. 5 shows a similar epoxy resin e-brick comprising shredded feedstock. The clear e-bricks depicted in FIGS. 4 and 5 provide an aesthetically pleasing building material that highlights the conscious purpose of recycling e-waste. Companies or individuals that wish to promote their commitment to recycling may use such materials in their buildings to showcase that commitment.

Figure 6:
FIG. 6 shows embodiments of opaque building material units of the present disclosure in various sizes and thicknesses.

FIG. 6 depicts several exemplary sizes of outdoor e-building materials, labeled e-Paver, e-Tile, e-Brick, and e-Stepper. The present disclosure is not limited to the sizes and shapes depicted, and may pertain to any kind of building material, whether decorative or structural, ASTM-rated or not, as discussed throughout this disclosure. FIG. 6 shows embodiments that, in contrast to the clear epoxy resin e-bricks shown in FIGS. 4 and 5, may appear no different outwardly than traditional concrete pavers or bricks. In some embodiments, the e-building materials may be marked with a brand or logo that identifies it as an e-building material, upon close inspection.

Figure 7:
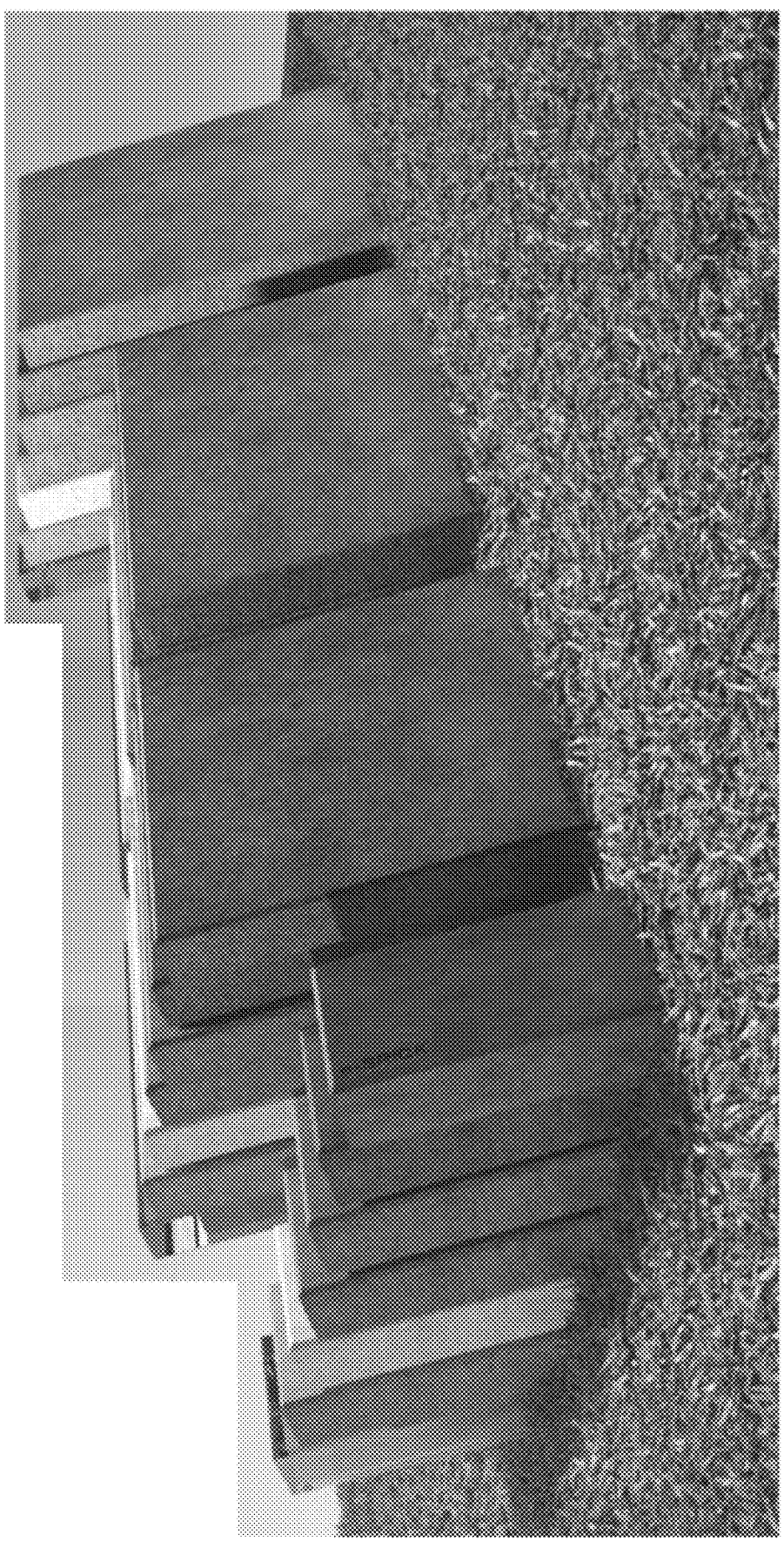
FIG. 7 shows embodiments of opaque and clear building material units of the present disclosure in various shades, illustrating that the materials may be different colors.

FIG. 7 shows that any size and/or shape of building material may come in a variety of colors. Many existing pavers, bricks, tiles, and other building materials come in a variety of colors to allow homeowners and builders to construct patios, driveways, sidewalks, and other surfaces according to their tastes. The examples depicted in FIGS. 4-7 are just a few of the possible embodiments of e-building materials according to the present disclosure. Given the variety of building materials available, it is possible that embodiments of the present disclosure may encompass any material that uses e-waste as a filler, structural component, or aggregate.

The methods of manufacturing e-building materials of the present disclosure may include casting, molding, layering, machining, and other fabrication methods. Materials may be hardened by any appropriate method of curing, firing, baking, cooling, or drying. Current known methods of fabricating building materials may be adapted to allow for the addition of e-waste as a component according to the present disclosure. Such adaptation may be accomplished, for example, by altering the order in which component materials are typically put together during manufacturing, or by including additional chemicals to improve the properties of the component materials in the end product.

Figure 8A:
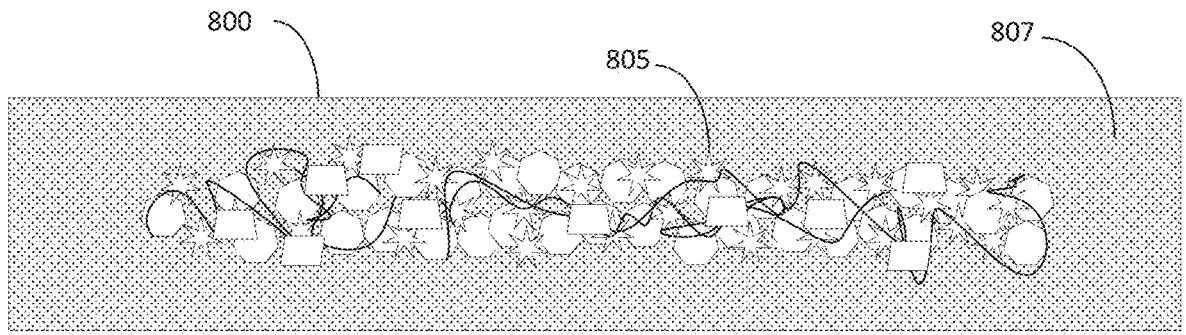
FIG. 8A shows a cross-sectional depiction of e-waste concentrated in a center of a building material unit.
Figure 8B:
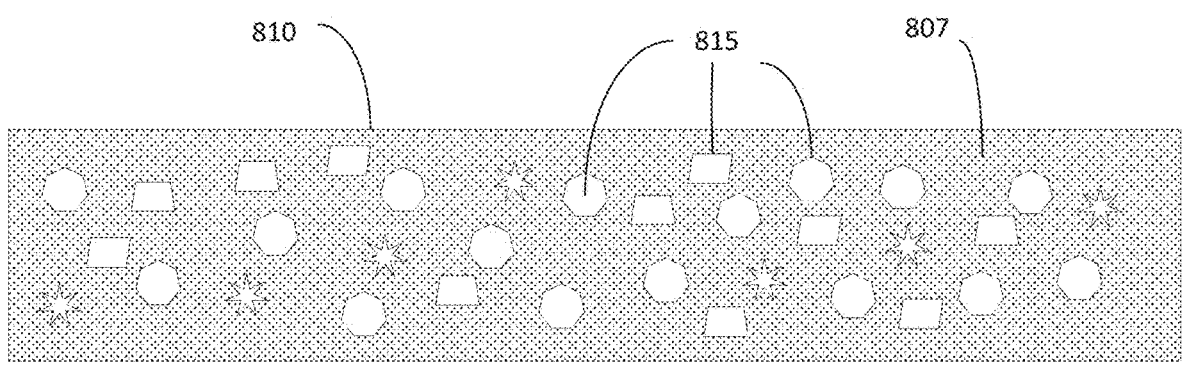
FIG. 8B shows a cross-sectional depiction of e-waste dispersed somewhat uniformly throughout a building material unit.

FIGS. 8A and 8B show cross sections of a e-building material unit (e.g., an e-brick) depicting how shredded or ground e-stock may be disposed within the non-leachable material comprising the rest of the e-brick. FIG. 8A shows an e-brick 800 having e-stock 805 concentrated in the middle of the e-brick 800 and surrounded by non-leachable material 807. FIG. 8B shows an alternative embodiment in which an e-brick 810 has e-stock 815 substantially uniformly dispersed throughout the non-leachable material 817. It is contemplated than in many embodiments of the present disclosure, the e-stock material may comprise anywhere between 5% and 90% by weight of any given e-building material. In many embodiments the e-stock material may comprise 15%-50% by weight of the e-building material.

Figure 9:
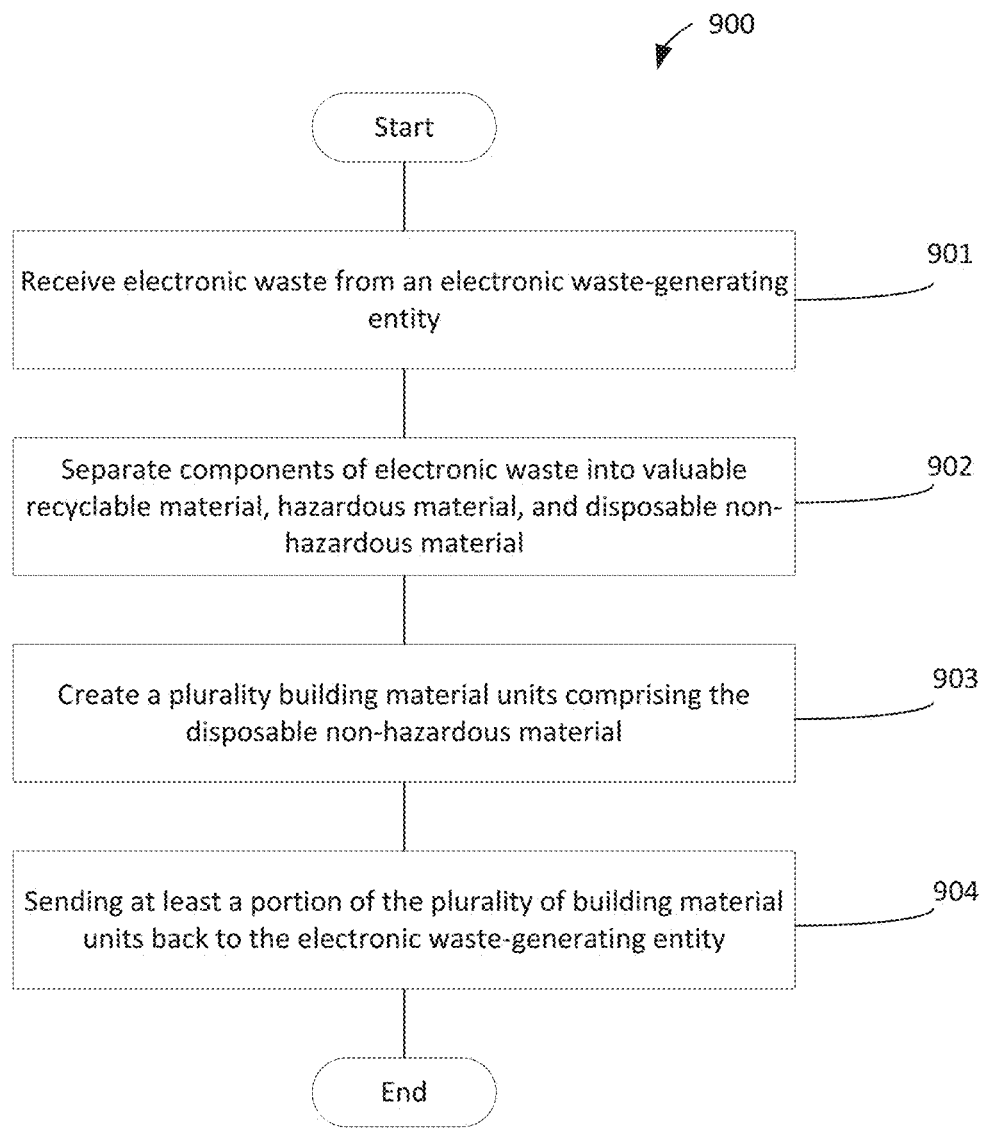
FIG. 9 is a flowchart that depicts a method that may be performed according to the present disclosure.

FIG. 9 is a flowchart which may be traversed to perform a method 900 of e-recycling according to the present disclosure. First, at 901, the method may include receiving electronic waste from an electronic waste-generating entity. Next, at 902, the method may include separating components of electronic waste into valuable recyclable material, hazardous material, and disposable non-hazardous material. Then, at 903, the method may include creating a plurality of building material units comprising the disposable non-hazardous material. Finally, at 904, the method may include sending at least a portion of the plurality of building material units back to the generator.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present invention is not intended to be limited to the embodiments shown herein but is to be accorded the widest scope consistent with the principles and novel features disclosed herein.

What is claimed is:

1. A method for recycling electronic waste, the method comprising:
   collecting electronic waste at a designated collection site;
   shredding the electronic waste into small pieces of e-stock material;
   creating a plurality of building material units by:
      encapsulating at least some of the small pieces of e-stock material in a non-leachable material;
      shaping the non-leachable material and e-stock material into a plurality of substantially uniform building material units; and
   providing at least some of the plurality of building material units for consumer end-use, wherein the collecting electronic waste at a designated collection site takes place at a retail store and providing at least some of the plurality of building material units takes place at the same retail store.

2. The method of claim 1, wherein the non-leachable material comprises an epoxy.

3. The method of claim 1, wherein the plurality of building material units comprises one or more of:
   pavestones;
   tiles; and
   bricks.

4. The method of claim 1, wherein:
   at least some of the plurality of building material units are translucent or transparent.

5. The method of claim 1, wherein the received electronic waste comprises whole electronic devices.

6. The method of claim 1, further comprising:
   separating components of the electronic waste into valuable recyclable material, hazardous material, and disposable non-hazardous material,
   wherein the disposable non-hazardous material is substantially uniformly dispersed within the non-leachable material within at least one of the plurality of building material units.

7. The method of claim 6, wherein the disposable non-hazardous material comprises at least 20% by volume of at least one of the plurality of building material units.

8. The method of claim 6, wherein at least a portion of the disposable non-hazardous material is ground into pieces ⅜ inch or smaller.

9. The method of claim 1, wherein the building material units further comprise one or more additives for:
   hardening;
   water-repelling; or
   coloring.

10. The method of claim 1, wherein the electronic waste is from an electronic waste-generating entity, and further comprising:
    tracking at least a portion of the electronic waste collected from the electronic waste-generating entity.

11. The method of claim 10, wherein the electronic waste-generating entity is a business classified as one of:
    a conditionally exempt small-quantity generator;
    a small quantity generator; or
    a large quantity generator.

* * * * *